United States Patent
Brock

(10) Patent No.: US 9,830,651 B1
(45) Date of Patent: Nov. 28, 2017

(54) CROWDFUNDING FRAMEWORK

(71) Applicant: Square, Inc., San Francisco, CA (US)

(72) Inventor: Zach Brock, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 14/167,931

(22) Filed: Jan. 29, 2014

(51) Int. Cl.
G06Q 40/04 (2012.01)
G06Q 40/06 (2012.01)

(52) U.S. Cl.
CPC .............. *G06Q 40/04* (2013.01); *G06Q 40/06* (2013.01)

(58) Field of Classification Search
CPC ...... G06Q 40/06; G06Q 40/04; G06Q 10/101; G06Q 30/0279; G06Q 40/02; G06Q 40/00; G06Q 30/02; G06Q 30/0215; G06Q 50/01; G06Q 50/163
See application file for complete search history.

(56) References Cited

U.S. PATENT DOCUMENTS

| | | | |
|---|---|---|---|
| 6,167,385 A | 12/2000 | Hartley-Urquhart | |
| 6,941,281 B1 | 9/2005 | Johnson | |
| 7,181,427 B1 | 2/2007 | DeFrancesco et al. | |
| 7,353,203 B1 | 4/2008 | Kriplani et al. | |
| 7,953,653 B2 | 5/2011 | Siggers et al. | |
| 8,219,335 B2 | 7/2012 | Marti et al. | |
| 8,239,227 B2 | 8/2012 | Megiddo et al. | |
| 8,666,847 B1 | 3/2014 | Blank et al. | |
| 8,732,040 B1 | 5/2014 | Prabhune et al. | |
| 8,799,133 B2 * | 8/2014 | Gula, IV | G06Q 40/06 705/35 |
| 2002/0038277 A1 | 3/2002 | Yuan | |

(Continued)

FOREIGN PATENT DOCUMENTS

| | | | | |
|---|---|---|---|---|
| CA | 2 838 406 | * | 1/2014 | ............ G06Q 30/02 |
| EP | 2 466 322 A1 | | 6/2012 | |

(Continued)

OTHER PUBLICATIONS

Steiberg et al.: The Crowdfunding Bible: How to raise money for any startup, video game or project, 2012, pp. 1-47.*

(Continued)

*Primary Examiner* — Bijendra K Shrestha

(74) *Attorney, Agent, or Firm* — Mattingly & Malur, PC

(57) ABSTRACT

A computing device receives a request to establish a crowdfunding project for a business, the request describing an amount of funding being requested by the business, and terms and conditions for owning shares in the business. The computing device generates a crowdfunding interface for the crowdfunding project, the interface including the amount of funding being requested, the terms and conditions for owning shares in the business, a share price, and an option for purchasing shares. The computing device receives, from investors and through the crowdfunding interface, requests to purchase a specified number of shares in the business. The computing device allocates, to each investor, the respective number of shares purchased. The computing device determines that the amount of funding being requested by the business has been satisfied. The computing device determines that the business is able to pay dividends. The computing device provides a respective dividend payment to each investor.

13 Claims, 5 Drawing Sheets

(56) References Cited

U.S. PATENT DOCUMENTS

| | | | |
|---|---|---|---|
| 2002/0161558 A1 | 10/2002 | Georges et al. | |
| 2002/0174061 A1 | 11/2002 | Srinivasan et al. | |
| 2003/0101107 A1 | 5/2003 | Agarwal et al. | |
| 2004/0054625 A1 | 3/2004 | Kellogg et al. | |
| 2004/0064398 A1 | 4/2004 | Browne et al. | |
| 2004/0193540 A1 | 9/2004 | Brown et al. | |
| 2006/0095350 A1 | 5/2006 | Hall et al. | |
| 2007/0117601 A1* | 5/2007 | Van Luchene | G06Q 30/04 463/1 |
| 2007/0156579 A1 | 7/2007 | Manesh | |
| 2007/0156584 A1 | 7/2007 | Barnes et al. | |
| 2007/0174191 A1 | 7/2007 | Keaton et al. | |
| 2007/0255635 A1 | 11/2007 | Multer et al. | |
| 2007/0255653 A1 | 11/2007 | Tumminaro et al. | |
| 2008/0033825 A1 | 2/2008 | Goldin | |
| 2008/0052229 A1 | 2/2008 | Sheinker et al. | |
| 2008/0109348 A1 | 5/2008 | Saxena et al. | |
| 2008/0154769 A1 | 6/2008 | Anderson et al. | |
| 2009/0043697 A1 | 2/2009 | Jacobs et al. | |
| 2010/0032308 A1 | 2/2010 | Qi et al. | |
| 2010/0228651 A1 | 9/2010 | Becerra et al. | |
| 2010/0268667 A1 | 10/2010 | King et al. | |
| 2010/0299251 A1 | 11/2010 | Thomas | |
| 2010/0306071 A1 | 12/2010 | Kay | |
| 2011/0055056 A1* | 3/2011 | Kwatinetz | G06Q 40/06 705/30 |
| 2011/0202445 A1* | 8/2011 | Torres | G06Q 40/00 705/37 |
| 2011/0251870 A1 | 10/2011 | Tavares et al. | |
| 2012/0011071 A1 | 1/2012 | Pennock et al. | |
| 2012/0022945 A1 | 1/2012 | Falkenborg et al. | |
| 2012/0054097 A1 | 3/2012 | Frohwein et al. | |
| 2012/0066033 A1 | 3/2012 | Frohwein et al. | |
| 2012/0089436 A1 | 4/2012 | Tavares et al. | |
| 2012/0143649 A1* | 6/2012 | Aubertin | G06Q 10/0635 705/7.28 |
| 2012/0191525 A1 | 7/2012 | Singh et al. | |
| 2012/0209734 A1 | 8/2012 | Brooks et al. | |
| 2012/0226595 A1* | 9/2012 | Torres | G06Q 40/06 705/37 |
| 2012/0233010 A1 | 9/2012 | Frohwein et al. | |
| 2012/0233090 A1 | 9/2012 | Tavares et al. | |
| 2012/0239552 A1 | 9/2012 | Harycki | |
| 2012/0271765 A1 | 10/2012 | Cervenka et al. | |
| 2013/0054484 A1 | 2/2013 | Hoeflinger et al. | |
| 2013/0085804 A1 | 4/2013 | Leff et al. | |
| 2013/0124432 A1* | 5/2013 | Thibodeau | G06Q 40/06 705/36 R |
| 2013/0138544 A1 | 5/2013 | Chapman | |
| 2013/0185228 A1* | 7/2013 | Dresner | G06Q 40/06 705/36 R |
| 2013/0204664 A1 | 8/2013 | Romagnolo et al. | |
| 2013/0226688 A1* | 8/2013 | Harvilicz | G06Q 30/02 705/14.39 |
| 2013/0268417 A1 | 10/2013 | Sgueglia | |
| 2013/0332265 A1* | 12/2013 | Sossaman, II | G06Q 30/0242 705/14.45 |
| 2014/0006202 A1 | 1/2014 | Frohwein et al. | |
| 2014/0025473 A1* | 1/2014 | Cohen | G06Q 30/0207 705/14.28 |
| 2014/0032298 A1 | 1/2014 | Corrie et al. | |
| 2014/0032307 A1 | 1/2014 | Corrie et al. | |
| 2014/0032308 A1 | 1/2014 | Corrie et al. | |
| 2014/0032309 A1 | 1/2014 | Corrie et al. | |
| 2014/0032310 A1 | 1/2014 | Corrie et al. | |
| 2014/0040157 A1* | 2/2014 | Cohen | G06Q 40/06 705/329 |
| 2014/0052668 A1* | 2/2014 | Cameron | G06Q 40/06 705/36 R |
| 2014/0058804 A1 | 2/2014 | Zhou et al. | |
| 2014/0143120 A1* | 5/2014 | Clarke | G06Q 40/04 705/37 |
| 2014/0143124 A1* | 5/2014 | Sanders | G06Q 40/06 705/37 |
| 2014/0143405 A1 | 5/2014 | Pavlidis et al. | |
| 2014/0164049 A1 | 6/2014 | Yakos et al. | |
| 2014/0171039 A1 | 6/2014 | Bjontegard | |
| 2014/0229397 A1* | 8/2014 | Fink | G06Q 30/0279 705/329 |
| 2014/0244361 A1 | 8/2014 | Zhang et al. | |
| 2014/0244486 A1 | 8/2014 | Abril | |
| 2014/0279682 A1* | 9/2014 | Feldman | G06Q 40/06 705/36 R |
| 2014/0304137 A1 | 10/2014 | Olson et al. | |
| 2014/0316823 A1 | 10/2014 | Cooper | |
| 2014/0344037 A1* | 11/2014 | Dunbar | G06Q 30/0279 705/14.16 |
| 2014/0351116 A1 | 11/2014 | Hoff | |
| 2014/0358766 A1 | 12/2014 | Nayyar et al. | |
| 2015/0039490 A1 | 2/2015 | Forrester et al. | |
| 2015/0100475 A1 | 4/2015 | Cummings et al. | |
| 2015/0149333 A1 | 5/2015 | Yaplee et al. | |
| 2015/0161606 A1 | 6/2015 | Lee | |
| 2015/0168478 A1 | 6/2015 | Öhlen et al. | |
| 2015/0170286 A1* | 6/2015 | Gingell | G06Q 30/018 705/36 R |

FOREIGN PATENT DOCUMENTS

| | | |
|---|---|---|
| WO | 99/03076 A1 | 1/1999 |
| WO | 2012/150985 A1 | 11/2012 |

OTHER PUBLICATIONS

Agrawal et al.: Some Simple Economics of Crowdfunding, Jun. 1, 2013, University of Toronto, Canada, pp. 1-46.*

Advisory Action dated Jul. 27, 2015, for U.S. Appl. No. 14/491,958, of Poursartip, A., et al., filed Sep. 19, 2014.

Non-Final Office Action dated Aug. 27, 2015, for U.S. Appl. No. 14/675,127, of Shearer, D.J., et al., filed Mar. 31, 2015.

U.S. Appl. No. 14/491,958, of Poursartip, A., et al., filed Sep. 19, 2014.

U.S. Appl. No. 14/491,963, of Poursartip, A., et al., filed Sep. 19, 2014.

U.S. Appl. No. 14/491,965, of Poursartip, A., et al., filed Sep. 19, 2014.

U.S. Appl. No. 14/491,967, of Poursartip, A., et al., filed Sep. 19, 2014.

U.S. Appl. No. 14/602,486, of Fern, A.J., et al., filed Jan. 22, 2015.

U.S. Appl. No. 14/616,515, of Boates, B., et al., filed Feb. 6, 2015.

U.S. Appl. No. 14/616,520, of Boates, B., et al., filed Feb. 6, 2015.

U.S. Appl. No. 14/622,605, of Scott, J.B., et al., filed Feb. 13, 2015.

U.S. Appl. No. 14/633,209, of Boates, D.J., et al., filed Mar. 19, 2015.

U.S. Appl. No. 14/675,127, of Shearer, D.J., et al., filed Mar. 31, 2015.

U.S. Appl. No. 14/675,257, of Shearer, D.J., et al., filed Mar. 31, 2015.

U.S. Appl. No. 14/676,678, of Scott, J.B., et al., filed Apr. 1, 2015.

Non-Final Office Action dated Jan. 8, 2015, for U.S. Appl. No. 14/491,958, of Poursartip, A., et al., filed Sep. 19, 2014.

Non-Final Office Action dated Mar. 27, 2015, for U.S. Appl. No. 14/491,965, of Poursartip, A., et al., filed Sep. 19, 2014.

Non-Final dated Mar. 27, 2015, for U.S. Appl. No. 14/491,967, of Poursartip, A., et al. filed Sep. 19, 2014.

Final Office Action dated May 20, 2015, for U.S. Appl. No. 14/491,958, of Poursartip, A., et al., filed Sep. 19, 2014.

International search report and written opinion, for PCT Application No. PCT/SE2013/051008, dated Dec. 20, 2013.

Non-Final Office Action dated Aug. 27, 2015, for U.S. Appl. No. 14/540,947, of Baker, G. K., et al., filed Nov. 13, 2014.

Non-Final Office Action dated Jan. 13, 2016, for U.S. Appl. No. 14/663,209, of Boates, B., et al., filed Mar. 19, 2015.

Non-Final Office Action dated Jan. 21, 2016, for U.S. Appl. No. 14/675,257, of Shearer, D. J., et al., filed Mar. 31, 2015.

Non-Final Office Action dated Feb. 12, 2016, for U.S. Appl. No. 14/540,947, of Baker, G. K., et al., filed Nov. 13, 2014.

(56) References Cited

OTHER PUBLICATIONS

Final Office Action dated Mar. 31, 2016, for U.S. Appl. No. 14/675,127, of Shearer, D. J., et al., filed Mar. 31, 2015.
Final Office Action dated Oct. 8, 2015, for U.S. Appl. No. 14/491,967, of Poursartip, A., et al., filed Sep. 19, 2014.
Final Office Action dated Nov. 6, 2015, for U.S. Appl. No. 14/491,965, of Poursartip, A., et al., filed Sep. 19, 2014.
Non-Final Office Action dated Jan. 5, 2016, for U.S. Appl. No. 14/491,958, of Poursartip, A., et al., filed Sep. 19, 2014.
Non-Final Office Action dated Jan. 5, 2016, for U.S. Appl. No. 14/167,958, of Poursartip, A., et al., filed Sep. 19, 2014.
Non-Final Office Action dated Sep. 9, 2016, for U.S. Appl. No. 14/540,947, of Baker, G. K., filed Nov. 13, 2014.
Final Office Action dated Oct. 7, 2016, for U.S. Appl. No. 14/675,257, of Shearer, D. J., et al., filed Mar. 31, 2015.
Non-Final Office Action dated Jun. 17, 2016, for U.S. Appl. No. 14/491,965, of Poursartip, A., et al., filed Sep. 19, 2014.
Non-Final Office Action dated Jun. 17, 2016, for U.S. Appl. No. 14/622,605, of Scott, J.B., et al., filed Feb. 13, 2015.
Final Office Action dated Aug. 3, 2016, for U.S. Appl. No. 14/663,209, of Boates, B., et al., filed Mar. 19, 2015.
Non-Final Office Action dated Apr. 27, 2016, for U.S. Appl. No. 14/616,515, of Boates, B., et al., filed Feb. 6, 2015.
Non-Final Office Action dated May 5, 2016, for U.S. Appl. No. 14/491,967, of Poursartip, A., et al., filed Sep. 19, 2014.
Final Office Action dated Oct. 21, 2016, for U.S. Appl. No. 14/491,967, of Poursartip, A., et al., filed Sep. 19, 2014.
Non-Final Office Action dated Nov. 3, 2016, for U.S. Appl. No. 14/675,127, of Shearer, D.J., et al., filed Mar. 31, 2015.
Non-Final Office Action dated Nov. 28, 2016, for U.S. Appl. No. 14/491,963, of Poursartip, A., et al., filed Sep. 19, 2014.
Giusti, A.C.,"Want More Revenue? Enhance the Offers: Carefully matching merchants with the right products and ensuring agents know them well can dictate how much an ISO may earn from value-added services," ISO & Agent 7.4, dated May 1, 2011, pp. 2.
Leung, L., "PayPal ramps up small-business loans," The Orange County register, Journal—Gazette [Ft. Wayne, Ind], dated Feb. 10, 2014, pp. 2.

Non-Final Office Action dated Dec. 19, 2016, for U.S. Appl. No. 14/491,965, of Poursartip, A., et al., filed Sep. 19, 2014.
Examiner's Answer to Appeal Brief dated Jan. 27, 2017, for U.S. Appl. No. 14/491,958, of Poursartip, A., et al., filed Sep. 19, 2014.
Non-Final Office Action dated Feb. 10, 2017, for U.S. Appl. No. 14/622,605, of Scott, J.B., et al., filed Feb. 13, 2015.
Final Rejection dated Feb. 17, 2017, for U.S. Appl. No. 14/616,515, of Boates, B., et al., filed Feb. 6, 2015.
Non-Final Office Action dated Mar. 1, 2017, for U.S. Appl. No. 14/616,520, of Boates, B., et al., filed Feb. 6, 2015.
Notice of Allowance dated Mar. 30, 2017, for U.S. Appl. No. 14/491,967, of Poursartip, A., et al., filed Sep. 19, 2014.
Final Office Action dated Apr. 6, 2017, for U.S. Appl. No. 14/540,947, of Baker, G.K., filed Nov. 13, 2014.
Final Office Action dated Apr. 10, 2017, for U.S. Appl. No. 14/675,127, of Shearer, D.J., et al., filed Mar. 31, 2015.
"Oracle Retail Advanced Inventory Planning," www.oracle.com, pp. 1-2 (2013).
Barr, A., "Update 5—Amazon offering loans to its on line sellers," www.reuters.com, dated Sep. 27, 2012, Retrieved from the Internet URL: http://www.reuters.com/article/amazon-lending-idUSL1E8KRA1020120927?type=companyNews, on Jun. 1, 2017, pp. 1-4.
Non-Final Office Action dated May 10, 2017, for U.S. Appl. No. 14/602,486, of Fern, A.J., et al., filed Jan. 22, 2015.
Non-Final Office Action dated May 16, 2017, for U.S. Appl. No. 14/676,678, of Scott, J.B., et al., filed Apr. 1, 2015.
Notice of Allowance dated May 25, 2017, for U.S. Appl. No. 14/663,209, of Boates, B., et al., filed Mar. 19, 2015.
Notice of Allowance dated May 31, 2017, for U.S. Appl. No. 14/675,257, of Shearer, D.J., et al., filed Mar. 31, 2015.
Notice of Allowance dated Jun. 7, 2017, for U.S. Appl. No. 14/491,963, of Poursartip, A., et al., filed Sep. 19, 2014.
Notice of Allowance dated Jun. 22, 2017, for U.S. Appl. No. 14/540,947, of Baker, G.K., filed Nov. 13, 2014.
Notice of Allowance dated Jul. 24, 2017, for U.S. Appl. No. 14/616,515, of Boates, B., et al., filed Feb. 6, 2015.
Final Office Action dated Jul. 27, 2017, for U.S. Appl. No. 14/491,965, of Poursartip, A., et al., filed Sep. 19, 2014.

\* cited by examiner

CROWDFUNDING FRAMEWORK

BACKGROUND

Individuals can collectively pool their funds to support a cause or project. Often, this type of crowdfunding can be performed using an intermediary service that unites individuals that are willing to contribute funds for projects and other individuals that are seeking funds for their projects. Those individuals that are willing to contribute funds can interact with an intermediary service over the Internet to designate projects to which they wish to contribute. The intermediary service can receive funds from supporters and disburse the received funds to the appropriate projects.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
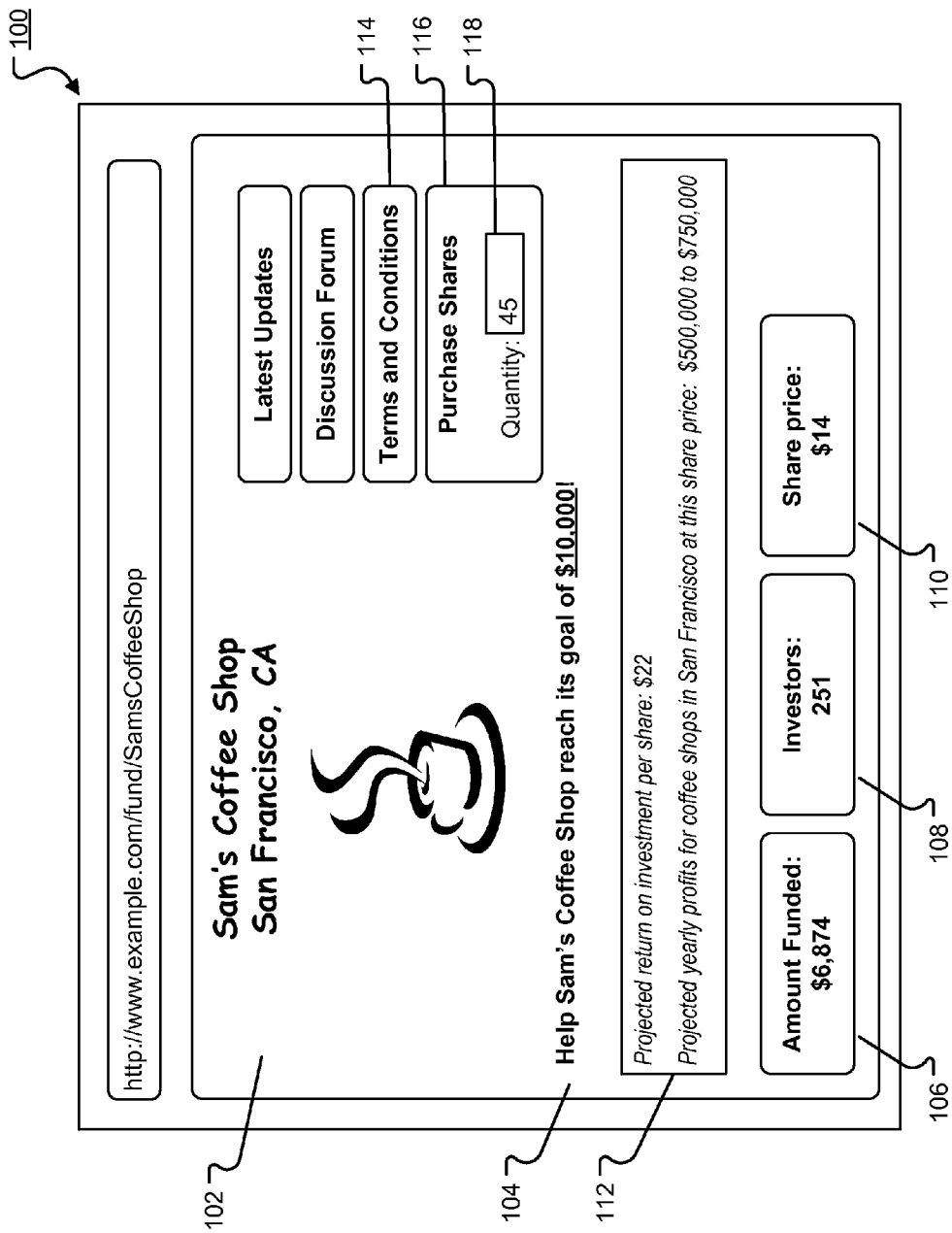
FIG. 1 illustrates an exemplary view of an interface for crowdfunding a business.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Systems and methods in accordance with various embodiments of the present disclosure overcome one or more of the above-referenced and other deficiencies in conventional approaches to providing a framework for crowdfunding new businesses. In particular, various embodiments of the present disclosure can provide a method for allowing investors to fund a new business, for example, by purchasing shares in the business, and providing a framework for the investors to receive a portion of the future funds, e.g., revenue or profit, generated by the business. Other advantages, variations, and functions are described and suggested below as may be provided in accordance with the various embodiments.

Crowdfunding typically involves a collective effort of entities, e.g., individuals or businesses, to contribute funds to a particular cause or business. As described herein, a crowdfunding system can provide individuals with a platform to seek funding from investors for their businesses. Specifically, an individual can interact with the crowdfunding system to present their business plan to investors, e.g., other individual or business entities, that wish to contribute funds to the individual's business. In exchange for contributing funds, investors can receive shares that correspond to some portion of the business, entitle them to a portion of future profits, output, etc. For, example, depending on the terms and conditions specified by the business, investors can receive remuneration, e.g., weekly dividends, from the business based on the amount of shares they purchased.

For example, a new business seeking $10,000 in funding can interact with the crowdfunding system to set up a crowdfunding proposal for investors. Depending on the implementation, the crowdfunding proposal can include information about the business, a business plan, the amount of funding being sought, shares in the business that are available for purchase, a current share price, together with terms and conditions for remuneration of contributed funds. The terms and conditions can identify any conditions that need to be satisfied before any funds will be repaid by the business, for example, in the form of dividends. The terms may state, for example, that dividends will be paid weekly once the business reaches profitability, and that 3 percent of the business's profits will be set aside for paying such dividends. Depending on the implementation, profitability can be determined if the business has been profitable since its inception, if the business was profitable for the financial year in which dividends are being paid, or if the business was profitable for a certain time period, e.g., week, month, or quarter, in which the dividends are being paid.

Investors can interact with the crowdfunding system to review the business plan and decide whether they want to contribute to the business. When contributing, the investors can purchase shares in the business through the crowdfunding system. The funds collected through share sales are provided to the business. Later, when the business is paying dividends, the number of shares purchased by each investor will be used to determine the amount of remuneration that investor receives, for example, from the revenue or profit that was generated by the business. The crowdfunding system can be configured to determine the amount of remuneration that is owed to each investor, to withdraw that amount from the business's financial accounts, and to deposit the appropriate amount in each investor's financial account.

FIG. 1 illustrates an example view 100 of an interface 102 for crowdfunding a business. The interface 102 is a graphical user interface that can be displayed on a display screen of a computing device and through an application, e.g., a web browser, that is running on the computing device. Some of the information presented in the interface 102 can be generated by a crowdfunding system, e.g., the crowdfunding system 220, as described in reference to FIG. 2. In some implementations, the crowdfunding system provides the information over a network, e.g., the Internet, through a web-based environment.

An entity can interact with the crowdfunding system, for example, through a web-based interface, to set up a crowdfunding project for funding their business. During the set up process, the entity can specify the amount of funding that is needed, the number of shares that are available for purchase by investors, a share price, and terms and conditions, for example, for profit or revenue sharing. The set up process is described in more detail in reference to FIG. 2.

Figure 2:
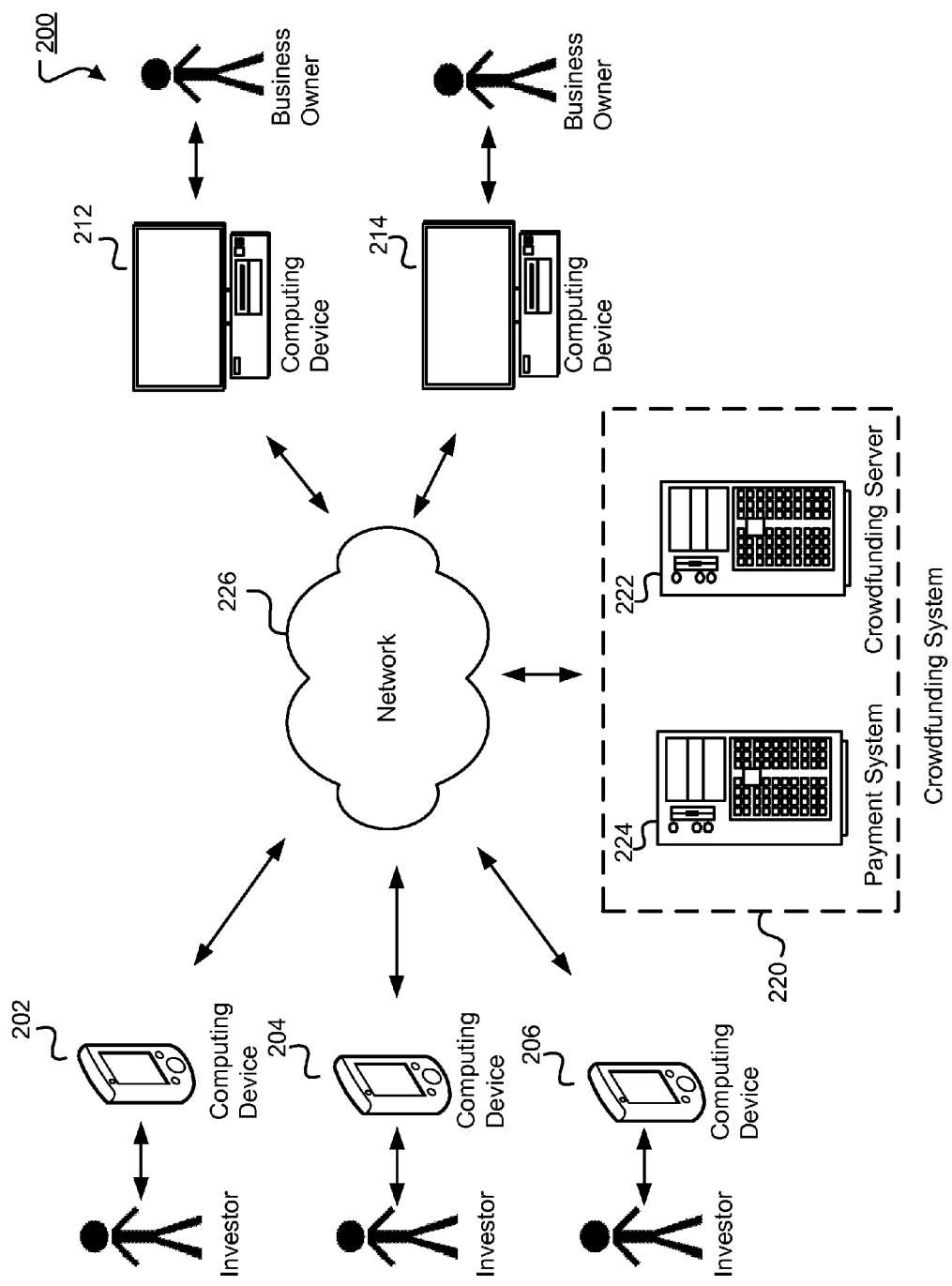
FIG. 2 illustrates an example of an environment for implementing a crowdfunding system.

Once the set up process is complete, an investor can interact with a computing device, e.g., the user device 202, as described in reference to FIG. 2, to access the interface 102 to learn more about the business and its crowdfunding project. For example, the business's crowdfunding project may be accessible over the Internet through a Uniform Resource Locator (URL), e.g., "http://www.example.com/fund/SamsCoffeeShop." In this example, the investor can access the URL through a web browser to learn more about the crowdfunding project.

The interface 102 provides the investor with information about the business, e.g., "Sam's Coffee Shop," that is seeking crowdfunding. This information can include the name and location of the business, together with a business plan that provides, for example, a formal statement of business goals, plans for reaching those goals, and background information about the business or team that is seeking funding. The interface 102 also provides details pertaining to the business's crowdfunding project including, for example, the total amount of funding being sought 104, the total amount that has so far been funded by other investors 106, the number of investors that have purchased shares in the business 108, and a purchase price for each share 110 in the business. The interface 102 may be formatted using logos and themes that are specified by the business.

In some implementations, the interface 102 provides information describing projected returns 112 for the business. For example, the crowdfunding system can determine these projected returns based on evaluating financial data associated with other businesses that are in a similar category, similar location, or both, as the business that is seeking crowdfunding. As described in reference to FIG. 2, the crowdfunding system can determine and provide a projected return on each share in the business, projected profits for other businesses in the same category and location as the business, projected profits for other businesses in the same category, location, and having the same share price as the business, to name a few examples. Such projections can be based on predicted returns on a daily, weekly, monthly, quarterly, or yearly basis.

The investor can review these projections when deciding whether to purchase shares in the business. The investor can also interact with the interface 102 to select an option 114 to review terms and conditions that define the scope of the financial relationship between the investor and the business including, for example, when profit or revenue sharing will occur and how much of the business's profit or revenue is allocated for sharing. The investor can also interact with the interface 102 to select an option 116 to purchase shares in the business through the crowdfunding system. The investor can also specify the number of shares that the investor wants to purchase in an input field 118.

FIG. 2 illustrates an example of an environment 200 for implementing a crowdfunding system 220. Although a mobile device environment is described for purposes of explanation, different environments may be used, e.g., a web-based environment, to implement various embodiments.

The exemplary environment 200 includes a crowdfunding system 220. The crowdfunding system 220 includes a crowdfunding server 222 and a payment server 224. The crowdfunding server 222 can be implemented as computer programs on one or more computers in one or more locations, in which the systems, components, and techniques described below can be implemented. The operation of the payment server 224 is described below in reference to FIG. 3. The example environment 200 also includes computing devices 202, 204, and 206, each of which is being operated by a separate investor that is interacting with the crowdfunding system 220 to invest in new businesses. The example environment 200 also includes computing devices 212 and 214, each of which is being operated by a business owner that is interacting with the crowdfunding system 220 to seek crowdfunding from investors.

The computing devices 202, 204, 206, 212, and 214 can each be a computer coupled to the crowdfunding system 220 through a data communication network 226, e.g., the Internet. The computing devices 202, 204, 206, 212, and 214 each generally include a memory, e.g., a random access memory (RAM), for storing instructions and data, and a processor for executing stored instructions. The computing devices 202, 204, 206, 212, and 214 can each include one or more components, e.g., software or hardware, that are operable to send and receive requests, messages, or other types of information over the network 226. Some examples of computing devices include personal computers, cellular phones, handheld messaging devices, laptop computers, personal data assistants, tablet devices, and the like.

The network 226 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The computing devices 202, 204, 206, 212, and 214, and the crowdfunding system 220 can communicate over the network 226 using wired or wireless connections, and combinations thereof.

For example, an entity operating the computing device 212 can interact with the crowdfunding system 220 to seek crowdfunding from investors. Initially, the entity will interact with the crowdfunding system 220 to set up a crowdfunding project for their new business.

In some implementations, the set up process involves specifying various terms of the crowdfunding project including, for example, the amount of funding that is needed, a share price, the number of shares that are available for purchase by investors, and some percentage of the business, e.g., in terms of revenue or profit, corresponding to the number of shares being offered for purchase. Depending on the implementation, these terms can be specified by the entity seeking crowdfunding, the crowdfunding system 220, or both.

For example, the entity can specify that it is seeking $20,000 in funding for its business, and is offering 2,000 shares at $10 per share. Further, the entity can specify that the 2,000 shares that are being offered for purchase correspond to 2 percent of the business's revenue, and that dividends paid from this revenue will be paid on a quarterly basis. Thus, if an investor owns 1,000 shares in the entity's business, then that investor is entitled to 1 percent of the business's revenue, and will receive the appropriate remuneration every quarter.

Further, terms pertaining to the business's shares may also be defined during the set up process. For example, depending on the implementation, the share price may be a statically defined price, e.g., $10, or a dynamic price that changes during the crowdfunding process. For example, the share price may start at $10, but can dynamically increase or decrease based on investor demand for shares in the business. The share price can also dynamically change as the amount of funds collected, i.e., amount generated from purchased shares, approaches the amount of funding that is being requested. The entity may also define additional terms that permit investors to resell their purchased shares, to restrict reselling of purchased shares entirely, or to restrict reselling of purchased shares to only the entity from which they were purchased.

In some implementations, the crowdfunding system 220 determines an initial share price for the entity's business. The share price can be determined based in part on the business's projected revenue or profit, on the risk that is associated with investing in the business, or both.

For example, the crowdfunding system 220 can project revenue or profit by evaluating financial data, for example, financial data obtained from the payment system 224, of other businesses that are similar to the entity's business and that are located near the entity's business location, or in similar locations in other cites. For example, the crowdfunding system 220 can evaluate sales data of other coffee shops that are located in San Francisco, Calif. to determine a projected revenue or profit for the entity's business.

Further, the crowdfunding system 220 can evaluate the financial data associated with other businesses that are in a similar category and location as the entity's business to determine a projected revenue or profit for the entity's business on a per daily, weekly, monthly, quarterly, or yearly basis. Other projections can also be determined in a similar manner including, for example, a projected return for each share in the entity's business, or projected revenue or profit for a business in the same category and location as the entity's business and that has a similar share price as the entity's business.

A payment system, e.g., the payment system 224, can be operated by a payment transaction entity and used to collect financial data for businesses. The operation of the payment system 224 is described in reference to FIG. 3. For example, each business can have at least one point-of-sale device, e.g., the merchant device 305, that is used to process financial transactions between customers and the business. The point-of-sale device operates through the payment system 224 and therefore provides the payment system 224 with ongoing access to the business's financial transactions, e.g., revenue. Consequently, the payment system 224 can store this financial data for use in generating projections, as described above, and in calculating the amount of funds, e.g., dividends, to be paid to investors of a business.

In some instances, when generating the share price, the crowdfunding system 220 may require the entity to complete a risk assessment. In performing the risk assessment, the crowdfunding system 220 may consider various factors including, for example, whether the entity has previously started and operated a business, the entity's credit rating, the entity's income, the entity's place of residence, among other factors.

In some embodiments the payment server 224 can provide data to the crowdfunding server 222. As addressed in FIG. 3, payment server can be used to process payments for merchants or businesses whether or not they are crowdfunded. Such data can be analyzed to understand the performance of these merchants. In many instances these merchants may not be publicly traded companies so data regarding merchants of this type can be hard to obtain by conventional means.

While many businesses or merchants will not necessarily run all transactions through the payment server 224, data regarding companies can be extrapolated by a regression factor or prediction of a percentage of a company's or merchant's transactions that are run through the payment server 224. In such instances it may be assumed that the nature of the transactions being passed through the payment server 224 are of like nature and size of other transactions not running through the payment server. If this assumption cannot be made, it can accounted for with an adjustment factor. In some embodiments, the payment server 224 or crowdfunding server 222 might run a regression analysis on companies utilizing the payment server 224 for a portion of its transactions when the payment server 224 or crowdfunding server 222 has access to or is given a total revenue measurement for a given time period. By running enough regressions to provide statistically meaningful revenue extrapolation and adjustment factors, the crowdfunding server can gain a better sense of businesses total revenue which can be used in identifying comparable companies and evaluating potential offerings and investments.

Each merchant or business can be associated with a business category and a geographic location. Business categories can include such categories as retail, services, wholesaler, coffee shop, apparel, food truck, four-star-dining, etc. It will be appreciated by those of ordinary skill in the art that the business categories can be far more expansive and may be more or less detailed than the examples provided. Geographic information can also be generalized to consider merchants similar if they are in the same neighborhood, or can even consider merchants similar if they are located in different cities, but are located in neighborhoods with similar characteristics. Such associations along with other business data such as size of company, or other relevant data points can be used to determine comparable companies.

Comparable company data can then be used to determine projected business value, revenue projections, or earning projections. Comparable company data can also be used to determine a factor by which earnings from such businesses outpace, or under perform market returns. Such factor is known in the art as "beta" and can be used to derive a cost of raising capital for a business using the well-known capital asset pricing model (CAPM) equation.

Owing to its access to or ability to derive comparable data the crowdfunding system 222 can provide entities seeking funding and investors for benchmarks of how much return they should offer and receive, respectively, given the predicted risk of the investment.

The set up process can also involve specifying whether the crowdfunding project is an open or closed system.

An open crowdfunding system does not prevent the entity from seeking funding from sources that are outside of the crowdfunding system. For example, sources that operate outside of the crowdfunding system may include venture capitalists that want to contribute to the entity's business directly. Thus, in an open crowdfunding system, the amount of funding that is requested by the entity need not be satisfied entirely by contributions that are received through the crowdfunding system 220 before such contributions can be disbursed to the entity. In such a system, the entity can communicate information to the crowdfunding system 220 to indicate that the amount of funding being requested has been satisfied. For example, the entity may be seeking $20,000 in funding, and may receive $10,000 in funding through the crowdfunding system 220 and another $10,000 in funding through external resources. In this example, the $10,000 collected through the crowdfunding system 220 will still be disbursed to the entity and investors that contributed to the entity's business will still be entitled to returns on their purchased shares.

A closed crowdfunding system requires that the entity satisfy the entire amount of funding being requested through the crowdfunding system 220 before the funds will be disbursed. For example, if the entity is seeking $20,000 in funding, then investors operating through the crowdfunding system 220 must purchase enough shares in the entity's business that satisfy the $20,000 funding request before the funding will be disbursed.

In either the open or closed system, a time limit, e.g., two months, for satisfying the amount of funding being requested may be specified by either the entity or the crowdfunding system 220.

When making contributions, investors essentially purchase shares in the entity's business. These shares correspond to some percentage of the entity's business and are used to determine the amount of funds, e.g., dividends, that are paid to each investor as remuneration for their investment. During the set up process, the entity can specify whether investors will be paid dividends from the business's generated revenue or profits, and how often, e.g., daily, weekly, monthly, quarterly, or yearly, such dividends will be paid.

Thus, assuming that the entity's business generated $50,000 in revenue in one month, that dividends were being paid on a monthly basis, and that the 2,000 total shares in the business correspond to 2 percent of the business's revenue. In this example, an investor that held 1,000 shares in the entity's business would receive a monthly payment of $500 from the business.

Also during the set up process, the entity can also specify certain conditions that must be met before investors will be allocated their portion of the generated funds. For example, the entity can specify a vesting term, e.g., six months, before dividends will be paid or a term, e.g., two years, within which dividends will be paid. In another example, the entity can specify that dividends will be paid once the entity's business is profitable. Profitability of the entity's business can be established in various ways including, for example, through a statement from a certified accountant that has reviewed the business's financial books.

Once the set up process is complete, an investor operating the computing device 202 can interact with the crowdfunding system 220 to purchase shares in the entity's business. For example, out of the 2,000 shares that are being offered in the entity's business, the investor may decide to purchase 500 shares. As described above, each share can be offered at $10 per share and the 2,000 shares offered for purchase may correspond to 2 percent of the business's revenue. In this example, the investor would contribute $5,000 in exchange for 500 shares. These 500 shares would entitle the investor to 0.5 percent of the business's revenue.

The investor can make the $5,000 payment by mailing in cash or a check to an organization that is operating the crowdfunding system 220, paying with a credit card through the crowdfunding system 220, or through a bank transfer to the crowdfunding system 220. The payments received from the investor can be disbursed to the entity through the crowdfunding system 220. In some implementations, the investor can interact with the crowdfunding system 220 to make a card-less payment, as described in reference to FIG. 3. In some implementations, the investor is a different business that is configured to use the payment system 224, as described below. In such implementations, the different business can make the payment by transferring an appropriate portion of the different business's revenue through the payment system 224.

Figure 3:
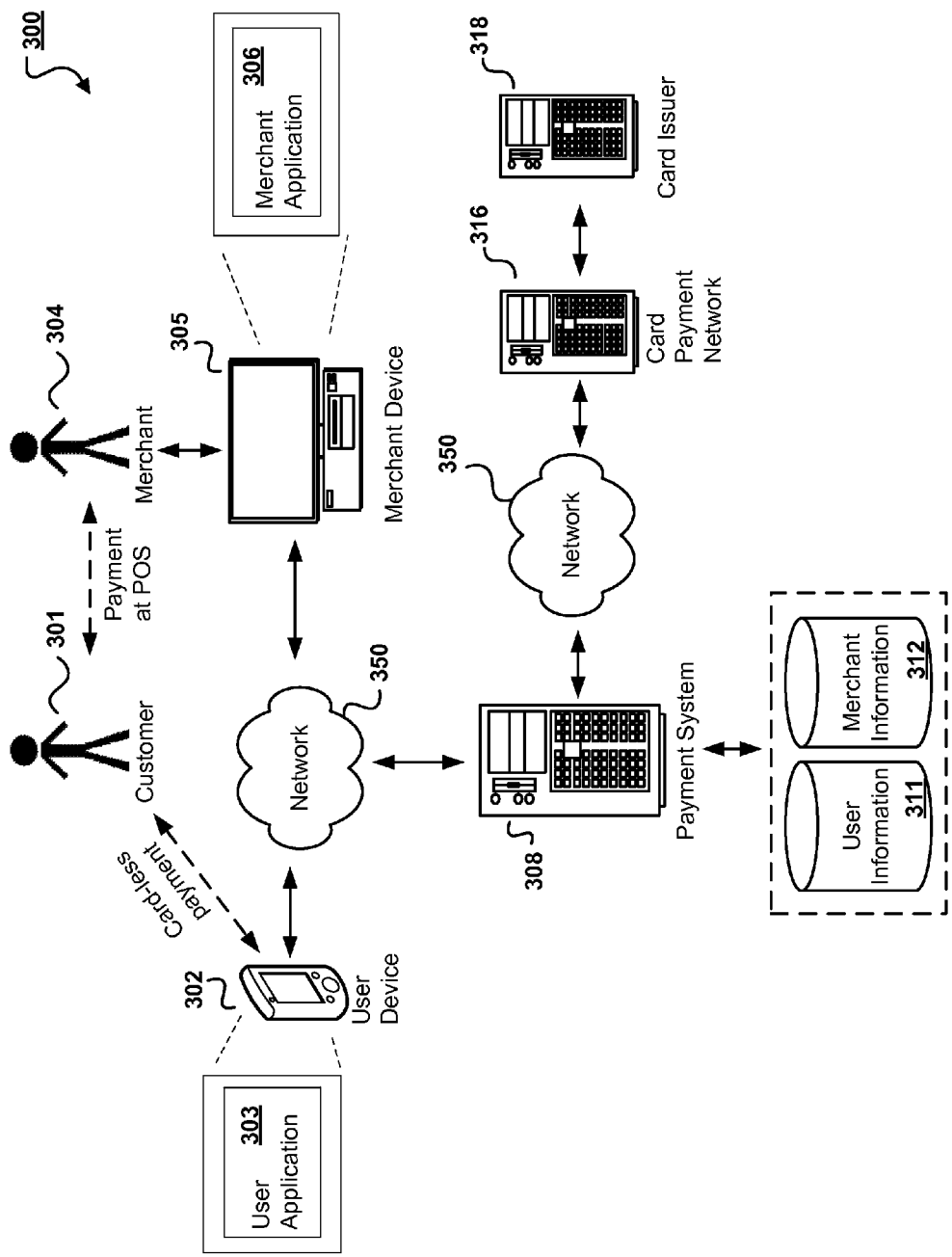
FIG. 3 illustrates an example of an environment for implementing a payment system.

Once the business is operational, the business can process financial transactions between customers and the business through point-of-sale devices, e.g., the merchant device 305, that are configured to interact with the payment system 224, as described in reference to FIG. 3. As a result, the point-of-sale devices provide the payment system 224 with ongoing access to the business's financial transactions.

The crowdfunding system 220 can evaluate the business's financial transactions to determine the business's profits or revenue. The crowdfunding system 220 is configured to allocate, to the business's investors, their portion of the funds that were generated from the financial transactions, as determined based on the respective number of shares the investors own in the business. The crowdfunding system 220 can make such allocations based on the terms and conditions that were specified during the set up process, as described above.

Thus, depending on the terms and when conditions for allocation are satisfied, the crowdfunding system 220 can allocate, to the investors, their appropriate share of the business's revenue or profits at some specified time interval, e.g., on a per-transaction, daily, weekly, monthly, quarterly, or yearly basis. In some instances, allocations for investors for two or more time intervals can be batched into one allocation to reduce transaction costs. For example, if allocations are configured to be paid to investors on a daily basis, then such allocations can be batched into weekly payments. In some implementations, the business is tasked with the responsibility to allocate, to the investors, their appropriate share of the business's revenue or profits at some specified time interval, for example, in the form of a check or bank transfer.

In some implementations, the crowdfunding system 220 is configured to interact with the payment system 224 to deduct, at the appropriate time interval, the appropriate amount from the business's financial accounts, and to disburse funds to investors based on their respective shares in the business. For example, the investors can provide their respective bank account routing information to the crowdfunding system 220, and the crowdfunding system 220 can automatically deposit the appropriate amounts in each investor's respective bank account.

In some implementations, the crowdfunding system 220 is configured to send regular correspondence, e.g., e-mails, to the business's investors at some specified time interval, e.g., weekly, to provide the investors with a summary of their earnings based on the business's revenue or profits and on the investors respective shares in the business.

In some instances, safeguards can be implemented to reduce fraud by businesses. For example, businesses may be required to submit their yearly tax documents to the crowdfunding system 220. The crowdfunding system 220 can be configured to evaluate such tax documents to determine whether the business's earnings, as determined by the payment system 224, are consistent with the business's earnings that were reported on the tax documents.

In some embodiments, fraud can also be reduced by using data collected across all businesses utilizing the payment server, to project what a companies revenue is expected to be. If a company reported revenue deviates from the projection by greater than an acceptable deviation, a company can be flagged for an audit.

FIG. 3 illustrates an example of an environment 300 for implementing a payment system 308. Although a mobile device environment is described for purposes of explanation, different environments may be used, e.g., a web-based environment, to implement various embodiments.

The example environment 300 includes a payment system 308, e.g., the payment system 224, as described above, which can be implemented as computer programs on one or more computers in one or more locations, in which the systems, components, and techniques described below can be implemented. The example environment 300 also includes a user device 302 and a merchant device 305.

The user device 302 and the merchant device 305 can each be a computer coupled to the payment system 308 through a data communication network 350, e.g., the Internet. The user device 302 and the merchant device 305 each generally include a memory, e.g., a random access memory (RAM), for storing instructions and data, and a processor for executing stored instructions. The user device 302 and the merchant device 305 can each include one or more components, e.g., software or hardware, that are configured to respectively determine a geographic location of the user device 302 or the merchant device 305, using, for example, various geolocation techniques, e.g., a global positioning system (GPS). Further, the user device 302 and the merchant device 305 can each be any appropriate device operable to send and receive requests, messages, or other types of information over the network 350. Some examples of user devices include personal computers, cellular phones, handheld messaging devices, laptop computers, personal data assistants, tablet devices, and the like.

The network 350 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The payment system 308, the merchant device 305, and the user device 302 can communicate over the network using wired or wireless connections, and combinations thereof.

As used in this specification, a financial transaction is a transaction that is conducted between a customer 301 and a merchant 304 at a point-of-sale. When paying for a financial transaction, the customer 301 can provide the merchant 304 with cash, a check, or credit card for the amount that is due. The merchant 304 can interact with a point-of-sale device, e.g., merchant device 305, to process the financial transaction. During financial transactions, the point-of-sale device can collect data describing the financial transaction, including, for example, the amount of payment received from customers.

In some implementations, the payment system 308 is configured to accept card-less payment transactions from customers, e.g., the customer 301. As used in this specification, a card-less payment transaction is a transaction conducted between the customer 301 and a merchant 304 at the point-of-sale during which a financial account of the customer 301 is charged without the customer 301 having to physically present a financial payment card to the merchant 304 at the point-of-sale. That is, the merchant 304 need not receive any details about the financial account, e.g., the credit card issuer or credit card number, for the transaction to be processed.

Before conducting card-less payment transactions, the customer 301 typically creates a user account with the payment system 308. The customer 301 can create the user account, for example, by interacting with a user application 303 that is configured to perform card-less payment transactions and that is running on the user device 302. When creating a user account with the payment system 308, the customer 301 will provide portrait of the customer 301, data describing a financial account of the customer 301, e.g., credit card number, expiration date, and a billing address. This user information can be securely stored by the payment system 308, for example, in a user information database 311.

To accept card-less payment transactions, the merchant 304 typically creates a merchant account with the payment system 308 by providing information describing the merchant including, for example, a merchant name, contact information, e.g., telephone numbers, the merchant's geographic location address, and one or more financial accounts to which funds collected from users will be deposited. This merchant information can be securely stored by the payment system 308, for example, in a merchant information database 312.

The payment system 308 is configured to perform card-less payment transactions. The payment system 308 can include one or more servers that are configured to securely perform electronic financial transactions, e.g., electronic payment transactions, between a customer and a merchant, for example, through data communicated between the user device 302 and the merchant device 305. Generally, when a customer and a merchant enter into an electronic financial transaction, the transaction is processed by transferring funds from a financial account associated with the user account to a financial account associated with the merchant account.

The payment system 308 is configured to send and receive data to and from the user device 302 and the merchant device 305. For example, the payment system 308 can be configured to send data describing merchants to the user device 302 using, for example, the information stored in the merchant information database 312. For example, the payment system 308 can communicate data describing merchants that are within a threshold geographic distance from a geographic location of the user device 302, as described in this specification. The data describing merchants can include, for example, a merchant name, geographic location, contact information, and an electronic catalogue, e.g., a menu, that describes items that are available for purchase from the merchant.

In some embodiments, the payment system 308 is configured to determine whether a geographic location of the user device 302 is within a threshold geographic distance from a geographic location of the merchant device 305. The payment system 308 can determine a geographic location of the user device 302 using, for example, geolocation data provided by the user device 302. Similarly, the payment system 308 can determine a geographic location of the merchant device 305 using, for example, geolocation data provided by the merchant device 305 or using a geographic address, e.g., street address, provided by the merchant. Depending on the implementation, the threshold geographic distance can be specified by the payment system 308 or by the merchant.

Determining whether the user device 302 is within a threshold geographic distance of the merchant device 305 can be accomplished in different ways including, for example, determining whether the user device 302 is within a threshold geographic radius of the merchant device 305, determining whether the user device 302 is within a particular geofence, or determining whether the user device 302 can communicate with the merchant device 305 using a specified wireless technology, e.g., Bluetooth or Bluetooth low energy (BLE). In some embodiments, the payment system 308 restricts card-less payment transactions between the customer 301 and the merchant 304 to situations where the geographic location of the user device 302 is within a threshold geographic distance from a geographic location of the merchant device 305.

The payment system 308 can also be configured to communicate with a computer system 316 of a card payment network, e.g., Visa or MasterCard, over the network 350, or over a different network, for example, to conduct electronic financial transactions. The computer system 316 of the card payment network can communicate with a computer system 318 of a card issuer, e.g., a bank. There may be computer systems of other entities, e.g., the card acquirer, between the payment system 308 and the computer system 318 of the card issuer.

The customer 301 operating the user device 302 that is within a threshold geographic distance of the merchant 304 can interact with a user application 303 running on the user device 302 to conduct a card-less payment transaction with the merchant 304. While interacting with the user application 303, the customer 301 can select the merchant 304, from a listing of merchants, with whom the customer 301 wants to enter into a card-less payment transaction. The user can select the merchant 304, for example, by selecting a "check in" option associated with the merchant 304. The user device 302 can communicate data to the payment system 308 indicating that the customer 301 has checked in with the merchant 304. In response, the payment system 308 can communicate data to notify the merchant device 305 that the user has checked in. A merchant application 306 running on the merchant device 305 can notify the merchant 304 that the user has electronically checked in with the merchant 304 through a display screen of the merchant device 305.

Once checked in, the customer 301 can collect, or request, items that are available for purchase from the merchant 304. When the customer 301 is ready to enter into the card-less payment transaction, the customer 301 can, for example, approach a point-of-sale for the merchant 304 and identify him or herself. For example, the customer 301 can verbally notify the merchant 304 that the customer 301 wants to enter into a card-less payment transaction and can provide the merchant 304 with the customer's name. The merchant 304 can then interact with the merchant application 306 to select the customer 301, from a listing of customers that have checked in with the merchant 304, to initiate a card-less payment transaction for the items being purchased by the customer 301. For example, the merchant 304 can determine a total amount to bill the customer 301 for the items being purchased. The customer 301 can verbally approve the total amount to be billed and, in response, the merchant 304 can submit a request for a card-less payment transaction for the total amount to the payment system 308. In response, the payment system 308 can obtain, for example, from the user information database 311, data describing a financial account associated with a user account of the customer 301 to which the total amount will be billed.

The payment system 308 can then communicate with the computer system 316 of a card payment network to complete an electronic financial transaction for the total amount to be billed to the customer's financial account. Once the electronic financial transaction is complete, the payment system 308 can communicate data describing the card-less payment transaction to the user device 302, e.g., an electronic receipt, which can, for example, notify the customer 301 of the total amount billed to the user for the card-less payment transaction with the particular merchant.

Figure 4:
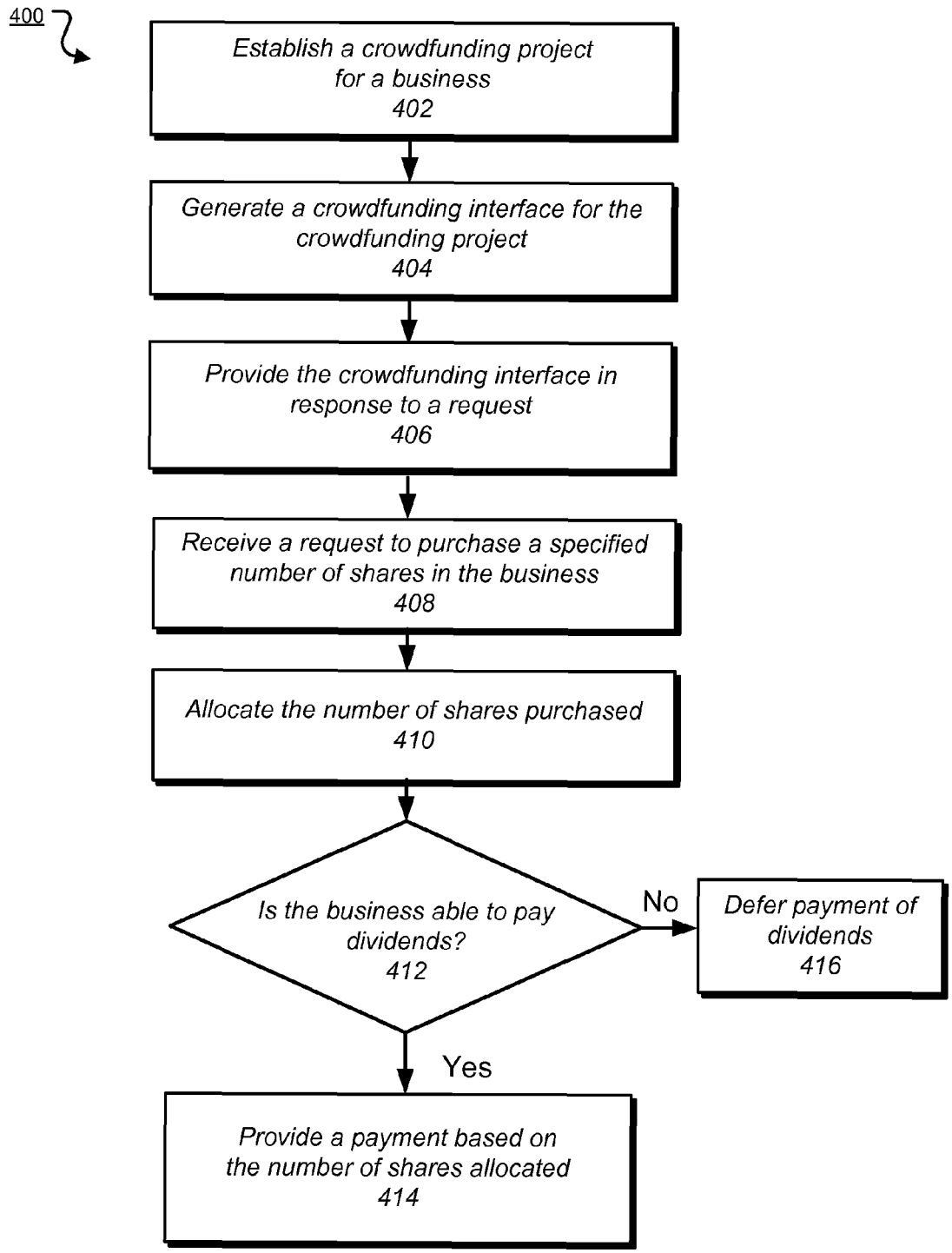
FIG. 4 illustrates an example process for generating a crowdfunding interface.

FIG. 4 illustrates an example process for generating a crowdfunding interface. The example process 400 is provided merely as an example and additional or fewer steps may be performed in similar or alternative orders, or in parallel, within the scope of the various embodiments described in this specification. A computing device receives, from a user operating a first computing device, a request to establish a crowdfunding project for a business 402. The request can include information describing the business, an amount of funding being requested by the business, and a proposed share price for a share in a specified portion of the business revenue or profit.

The computing device generates, based on the request, a crowdfunding interface for the crowdfunding project 404. The crowdfunding interface can include at least the amount of funding being requested, the proposed price for a share, a share price, and an option for purchasing one or more shares in the business.

The computing device provides the crowdfunding interface to the second computing device for display on a display screen of the second computing device in response to a request to access the crowdfunding interface 406. The computing device receives, from the second computing device and through the crowdfunding interface, a request to purchase a specified number of shares in the business 408. The computing device allocates, to the second computing device, the number of shares purchased 410. The computing device determines whether the business is able to pay dividends to the plurality of investors 412. The business may be able to pay dividends after a vesting term or on a determination that the business has reached profitability. If a determination is made that the business is able to pay dividends, the computing device provides, to the second computing device, a dividend payment based on the number of shares allocated to the second computing device 414. If a determination is made that the business is unable to pay dividends, the computing device defers payment of dividends 416.

Figure 5:
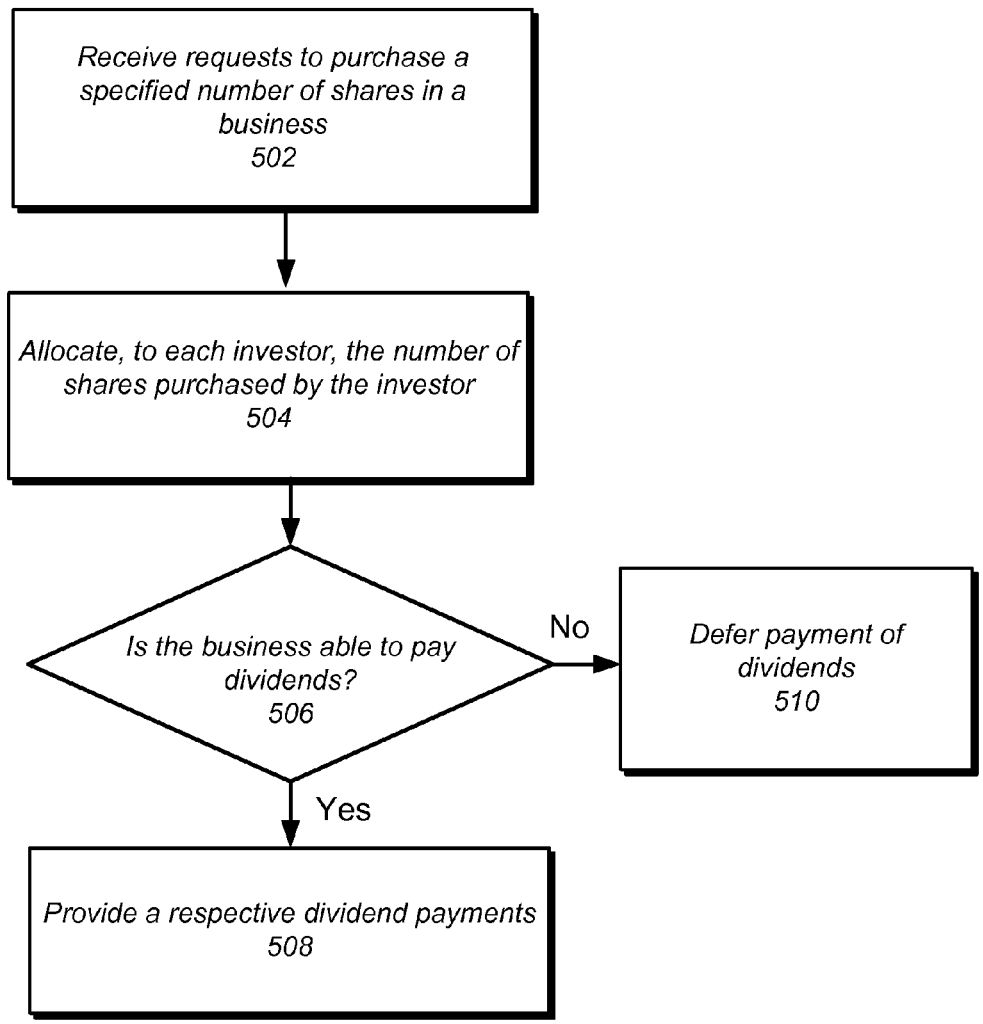
FIG. 5 illustrates an example process for providing payments to investors in a crowdfunding project.

FIG. 5 illustrates an example process for providing payments to investors in a crowdfunding project. The example process 500 is provided merely as an example and additional or fewer steps may be performed in similar or alternative orders, or in parallel, within the scope of the various embodiments described in this specification.

A computing device receives, from investors and through a crowdfunding interface for a business, respective requests to purchase a specified number of shares in the business 502. The computing device allocates, to each investor in the plurality of investors, the respective number of shares purchased by the investor 504. The computing device determines whether the business is able to pay dividends to the plurality of investors 506. The business may be able to pay dividends after a vesting term or on a determination that the business has reached profitability. If a determination is made that the business is able to pay dividends, the computing device provides a respective dividend payment to each investor in the plurality of investors 508. If a determination is made that the business is unable to pay dividends, the computing device defers payment of dividends 510.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:

receiving, by one or more processors of a crowdfunding and payment system, from a plurality of merchant computing devices, transaction data for a plurality of transactions corresponding to purchases by a plurality of customers from a plurality of merchants associated with the plurality of merchant computing devices, respectively, the transaction data including payment data to enable the one or more processors to process payments for each transaction;

receiving, by the one or more processors, from a first one of the merchant computing devices, a request to establish a crowdfunding project for a first business of a first one of the merchants, the request describing at least an amount of funding being requested by the first business, and terms and conditions for owning shares in the first business;

generating, by the one or more processors, based on the request, a crowdfunding interface for the crowdfunding project, the crowdfunding interface including at least the amount of funding being requested, the terms and conditions for owning shares in the first business, a share price, and an option for purchasing shares in the first business, wherein generating the crowdfunding interface further comprises:

determining at least one category and a geographic location for the first business;

evaluating, based at least partially on the received transaction data received from the plurality of merchant devices, financial data for other businesses that are associated with the at least one category and the geographic location; and generating at least one projected return on investment metric for the first business based on the evaluating, wherein the at least one projected return on investment metric is included in the crowdfunding interface;

receiving, by the one or more processors, from an investor and through the crowdfunding interface, a request to purchase a specified number of shares in the first business;

receiving, by the one or more processors, payment for the specified number of shares in the first business from the investor, the investor operating a second business as one of the plurality of merchants using a payment transaction entity associated with the crowdfunding and payment system to process financial transactions of the plurality of financial transactions between customers of the plurality of customers and the second business, by:

withholding, by the one or more processors, a portion of revenue from financial transactions for the second business; and transferring, by the one or more processors, the portion of revenue to an account of the first business as payment for the specified number of shares in the first business;

allocating, by the one or more processors, to the investor, the specified number of shares purchased by the investor;

determining, by the one or more processors, that the amount of funding being requested by the first business has been satisfied;

determining, by the one or more processors, based in part on the terms and conditions, that the first business is able to pay dividends;

processing, by the one or more processors, a plurality of subsequent financial transactions between customers and the first business, wherein the financial transactions are received from the first merchant computing device as a point-of-sale terminal;

allocating, by the one or more processors, a portion of each financial transaction in the plurality of financial transactions for dividend payments to investors; and providing, by the one or more processors, from the allocated portion of each financial transaction, a respective dividend payment to each investor in the plurality of investors.

2. The computer-implemented method of claim 1, wherein the terms and conditions further describe a number of shares in the first business that are available for purchase by investors and a specified percentage of the first business to which the number of shares correspond.

3. The computer-implemented method of claim 1, wherein providing the respective dividend payment to the investor further comprises:

determining the dividend payment based in part on revenue generated by the first business and on the specified number of shares in the first business that were allocated to the investor; and providing the dividend payment to the investor electronically from a financial account that is associated with the first business to a financial account that is associated with the investor.

4. The computer-implemented method of claim 1, wherein providing the respective dividend payment to the investor further comprises:
   determining, based on the terms and conditions, a percentage of the first business corresponding to a total number of shares purchased by a plurality of investors, wherein the percentage is specified by the user first business; and
   generating, at a specified time interval, the dividend payment for each the investor based on (i) the specified number of shares in the first business that were purchased by the investor, (ii) the percentage of the first business corresponding to the total number of shares purchased by the plurality of investors, and on (iii) a total amount of funds generated by the first business at the specified time interval.

5. A computing system comprising:
   one or more processors; and
   memory storing instructions that, when executed by the one or more processors, cause the computing system to perform operations, comprising:
      receiving, from a plurality of merchant computing devices, transaction data for a plurality of financial transactions corresponding to purchases by a plurality of customers from a plurality of merchants associated with the plurality of merchant computing devices, respectively, the transaction data including payment data to enable the one or more processors to process payments for each financial transaction;
      receiving, from an investor and through a crowdfunding interface for a first business, a purchase request, wherein the purchase request specifies a number of shares in the first business to purchase, wherein the crowdfunding interface is based at least partially on:
         determining at least one category and a geographic location for the first business;
         evaluating, based at least partially on the received transaction data received from the plurality of merchant devices, financial data for other businesses that are associated with the at least one category and the geographic location; and
         generating at least one projected return on investment metric for the first business based on the evaluating, wherein the at least one projected return on investment metric is included in the crowdfunding interface;
      processing financial transactions of the plurality of financial transaction between customers of the plurality of customers and a second business operated by the investor as one of the plurality of merchants;
      withholding a portion of revenue from the financial transactions processed for the second business;
      transferring the portion of revenue to an account of the first business as payment for the specified number of shares in the first business;
      allocating, to the investor, the number of shares in the first business;
      determining that the first business is able to pay dividends to the investor;
      processing a plurality of subsequent financial transactions between customers and the first business, wherein the financial transactions are received from the first merchant computing device as a point-of-sale terminal;
      determining an amount of remuneration for the investor from the revenue generated from the plurality of financial transactions; and
      providing the remuneration as a dividend payment to the investor based on the number of shares.

6. The computing system of claim 5, wherein determining that the first business is able to pay dividends to the investor further comprises:
   determining that an amount of funding being requested by the first business has been collected; and
   determining that conditions specified by the first business have been satisfied.

7. The computing system of claim 6, wherein the conditions include at least one of the following: determining that a vesting term specified by the first business is satisfied or determining that the first business has reached profitability.

8. The computing system of claim 6, wherein determining that an amount of funding being requested by the first business has been collected further comprises:
   determining that a portion of the amount of funding being requested by the first business was collected through external sources.

9. The computing system of claim 5, wherein providing the dividend payment to the investor further comprises:
   determining the dividend payment based in part on an amount of funds generated by the first business and on the number of shares in the first business that were allocated to the investor; and
   providing the dividend payment to the investor electronically from a financial account that is associated with the first business to a financial account that is associated with the investor.

10. The computing system of claim 5, wherein providing the dividend payment to the investor further comprises:
    determining a percentage of the first business corresponding to a total number of shares purchased by investors, wherein the percentage is specified by the first business; and
    generating, at a specified time interval, the dividend payment for the investor based on (i) a number of shares in the first business that were purchased by the investor, (ii) the percentage of the first business corresponding to the total number of shares purchased by investors, and on (iii) a total amount of funds generated by the first business at the specified time interval.

11. The computing system of claim 5, the operations further comprising:
    determining a first amount of funds that were generated by the first business for a particular time frame;
    obtaining at least one tax document for the first business, the at least one tax document specifying a second amount of funds that were generated by the first business for the particular time frame;
    determining, based on the second amount, that the first amount is inaccurate; and
    generating one or more fraud alerts for the first business.

12. The computing system of claim 5, the operations further comprising:
    determining a first amount of funds that were generated by the first business for a particular time frame;
    evaluating one or more financial accounts associated with the first business to determine a second amount of funds that were generated by the first business for the particular time frame;

determining, based on the second amount, that the first amount is inaccurate; and generating one or more fraud alerts for the first business.

13. The computing system of claim 5, the operations further comprising:

sending, to the investor at a specified time interval, correspondence providing the investor with a summary of earnings based in part on an amount of funds generated by the first business and on the specified number of shares in the first business that were purchased by the investor.

* * * * *